US006110573A

United States Patent [19]

Kobayashi et al.

[11] Patent Number: 6,110,573

[45] Date of Patent: Aug. 29, 2000

[54] HIGHLY CLEAN PLASTIC FILM OR SHEET AND PROCESS FOR ITS PRODUCTION

[75] Inventors: Hachiro Kobayashi; Sukeharu Kainuma, both of Tokyo, Japan

[73] Assignees: Nippon C.I.C. Technical Research Corp.; Showa Denko Plastic Products Co., Ltd.; Nisho Chemical Co., Ltd., all of Tokyo, Japan

[21] Appl. No.: 09/051,143

[22] PCT Filed: Oct. 15, 1996

[86] PCT No.: PCT/JP96/02986

§ 371 Date: Mar. 31, 1998

§ 102(e) Date: Mar. 31, 1998

[87] PCT Pub. No.: WO97/14628

PCT Pub. Date: Apr. 24, 1997

[30] Foreign Application Priority Data

Oct. 16, 1995 [JP] Japan .................................... 7-293678

[51] Int. Cl.[7] ................................ B32B 5/16; B08B 3/00

[52] U.S. Cl. .......................... 428/219; 428/220; 428/221; 428/338; 428/339; 428/35.5; 428/36.9; 134/1; 134/9; 134/37; 134/151; 15/1.51; 493/194; 493/227; 264/565

[58] Field of Search ................................. 428/35.2, 35.5, 428/323, 338, 332, 339, 340, 36.9, 221, 219, 220; 264/566, 565; 493/194, 227; 156/272.2; 15/1.51; 134/9, 32, 151, 1, 37

[56] References Cited

U.S. PATENT DOCUMENTS

| | | | |
|---|---|---|---|
| 4,281,431 | 8/1981 | Nierlich et al. | 15/1.51 |
| 4,288,255 | 9/1981 | Burger | 134/32 |
| 4,960,463 | 10/1990 | Brown | 106/11 |
| 5,830,280 | 11/1998 | Sato | 134/32 |

FOREIGN PATENT DOCUMENTS 7-330020 12/1995 Japan .

*Primary Examiner*—Rena L. Dye

*Attorney, Agent, or Firm*—Sughrue, Mion, Zinn, Macpeak & Seas, PLLC

[57] ABSTRACT

A plastic film or sheet, wherein upon immersing a test piece of the plastic film or sheet in ultrapure water, extracting pure water from near the surface of the test piece and evaluating the cleanliness of a resulting bag based on the concentration (number) of fine particles 0.3 $\mu$m or greater in size dispersed in the extracted ultrapure water, the measured concentration is no greater than 5 per ml. The process comprises steps of immersing and running a plastic film or sheet (1) in ultrapure water (4) in a clean room (16), and further spraying and washing the film or sheet (1) with ultrapure water after the film or sheet (1) is drawn out, followed by drying, destaticization, cutting and heat sealing.

18 Claims, 2 Drawing Sheets

HIGHLY CLEAN PLASTIC FILM OR SHEET AND PROCESS FOR ITS PRODUCTION

TECHNICAL FIELD

The present invention relates to a highly clean plastic film or sheet, and especially it relates to a plastic bag with particularly high cleanliness, which is used in production of semiconductors, precision instruments, electronic devices and the like, for medical and biorelated appliances, or for wrapping garment/gown, gloves, etc. used in clean rooms.

BACKGROUND ART

Semiconductor devices and parts are extremely hindered by dirt, dust and other contamination. Such devices and parts are therefore produced in clean rooms, while the garments, gloves and other operating utensils used must all be clean.

Clean rooms are controlled so as to maintain a prescribed degree of cleanliness. When clean parts, utensils, garments and the like for production of semiconductors are placed in bags to be brought into clean rooms, it is essential to use clean bags which are, naturally, free of dust inside, but which are also free of dust on both the inner and outer surfaces, since dust clinging to the outer surface will contaminate the clean room.

Known methods for cleaning of bags include washing in ultrapure water, and cleaning of films or sheets prior to manufacturing of the bags inside clean rooms. Another method involves coating both the front and back sides of an inner film or sheet for wrapping with a peelable outer film or sheet to prevent contamination of the inner film or sheet, and peeling off the outer film or sheet at the time of use and using the inner film or sheet to wrap a given article to be wrapped (Japanese Unexamined Patent Publication No. 6-285944).

In the method involving coating of the film or sheet with an outer layer, the bag must be wrapped after peeling off of each outer layer, while waste of the outer layer is also not economical.

Although cleaning of films and sheets by washing with ultrapure water is commonly known, almost no specific methods have been published. Suitable ultrapure water must be prepared for high cleaning of films and sheets, and the washing and drying methods must be specially modified. As a result, it has not been possible to achieve sufficient cleanliness of conventional plastic bags even by washing with ultrapure water.

In general, the cleanliness of films, sheets and bags is expressed relative to the clean room, such as in terms of causing no contamination of the clean room even when, for example, a class 10 clean room (according to Fed. Std. 209D. Same hereunder) is used, and the cleanliness of the sheets or bags themselves is never expressed quantitatively. Therefore, the expression of cleanliness is imprecise and subjectively influenced.

Measurement of fine particles on the surfaces of films or sheets can be accomplished, for example, with an optical microscope, but generally only sizes of 5 μm or greater may be detected, while fine particles with extremely small sizes of under 1 μm are almost impossible to detect. In addition, the very narrow visual field of the microscope does not allow easy measurement of fine particles in sections having certain areas. Detection of fine particles is also difficult in sections where the surface is bent or irregular.

The present invention provides a highly cleaned plastic film or sheet and a process for its production, and more preferably it provides a plastic film or sheet with high cleanliness through the successive process from molding of the film or sheet until its cleaning and formation into a bag, and particularly a process for manufacturing plastic bags.

DISCLOSURE OF THE INVENTION

In the process employed according to the invention, the degree of fine contaminating particles adhering to plastic films and sheets are evaluated, and the cleanliness of the plastic films or sheets is expressed in those numerical terms. Also, as a result of a modified washing process for the plastic films or sheets using a prescribed amount of ultrapure water, it is possible to produce plastic films and sheets with a high degree of cleanliness which has not been obtainable according to the prior art as compared in terms of the aforementioned numerical values.

In other words, the present invention provides a highly clean plastic film or sheet, wherein upon immersing a test piece of the plastic film or sheet in ultrapure water, extracting pure water from near the surface of the test piece and measuring the concentration (number) of fine particles 0.3 μm or greater in size dispersed in the extracted ultrapure water, the concentration is no greater than 1000 per ml, preferably no greater than 100 per ml, ideally no greater than 10 per ml and especially no greater than 5 per ml on both sides of the plastic film or sheet. Such highly clean plastic films and sheets have not hitherto been provided.

According to the present invention there is likewise provided a process for high cleaning of a plastic film or sheet, which is characterized in that (A) a plastic film or sheet is highly cleaned in a clean room, and (B) said high-cleaning process comprises the steps of:

i) immersing the plastic film or sheet in ultrapure water for washing, ii) exposing both sides of the plastic film or sheet drawn from the ultrapure water to spraying with ultrapure water for forcible washing, iii) removing the water from the plastic film or sheet, and iv) destaticizing the plastic film or sheet.

BEST MODE FOR CARRYING OUT THE INVENTION

The present invention relates to a high cleanliness plastic film or sheet wherein upon immersing a test piece of the plastic film or sheet in ultrapure water, extracting pure water from near the surface of the test piece and measuring the concentration (number) of fine particles 0.3 μm or greater in size released and dispersed in the ultrapure water, the concentration is no greater than 1000 per ml, preferably, no greater than 100 per ml, most preferably no greater than 10 per ml, particularly no greater than 5.0 per ml on both sides of the plastic film or sheet (the inner and outer sides in the case of a bag).

The material of the plastic film or sheet used may be any commonly used one such as polyethylene, polypropylene, nylon, polyester, ethylene-vinyl alcohol copolymer, polyvinylidene chloride, and it is not particularly restricted so long as it can be formed into a film or sheet. These may also be used either alone or in laminated layers. Particularly preferred are films and sheets with electrically conductive coated surfaces, for a surface electric resistance of $10^9$ Ω/□ or less to prevent static electricity. It is thus possible to prevent electrostatic adhesion of fine particles. An ideal multilayered film is described in Japanese Unexamined Patent Publication No. 62-94548. The thickness of the sheet or bag is not particularly restricted, and may normally be in the range of 30–150 μm. Plastic film or sheet products with a thickness of 1/100 inches (0.254 mm) or less are usually referred to as films while thicker products are referred to as sheets, and both are intended to be included.

The plastic film or sheet of the invention has fine particles of 0.3 μm or greater among the contamination on both sides (the inner and outer sides in the case of a bag) in a number of no greater than 1000 per ml, preferably no greater than 100 per ml, more preferably no greater than 10 per ml and especially no greater than 5 per ml, as evaluated by the measuring method described later. The contamination includes dirt, dust, particles, and the like, and most of it consists of fine particles about 0.1–10 μm in size. The number of fine particles is difficult to be measured directly by optical microscope or other microscopes, and therefore the following method was used according to the invention. This method has already been established and is described on pages 185–186 of the Proceedings of the 11th Air Cleaning and Contamination Control Research Convention (sponsored by JAPAN AIR CLEANING ASSOCIATION) held from Apr. 21–22, 1992 ("Evaluation of Surface Contamination by Measuring Particles Transferred to Pure Water"—Shuji Fujii, et al.) and on pages 145–148 of the Proceedings of the 12th Air Cleaning and Contamination Control Research Convention (same sponsor) held from Apr. 20–21, 1993 ("Evaluation of Surface Contamination by Measuring Concentration of Particles Transferred to Pure Water"—same authors).

Figure 1:
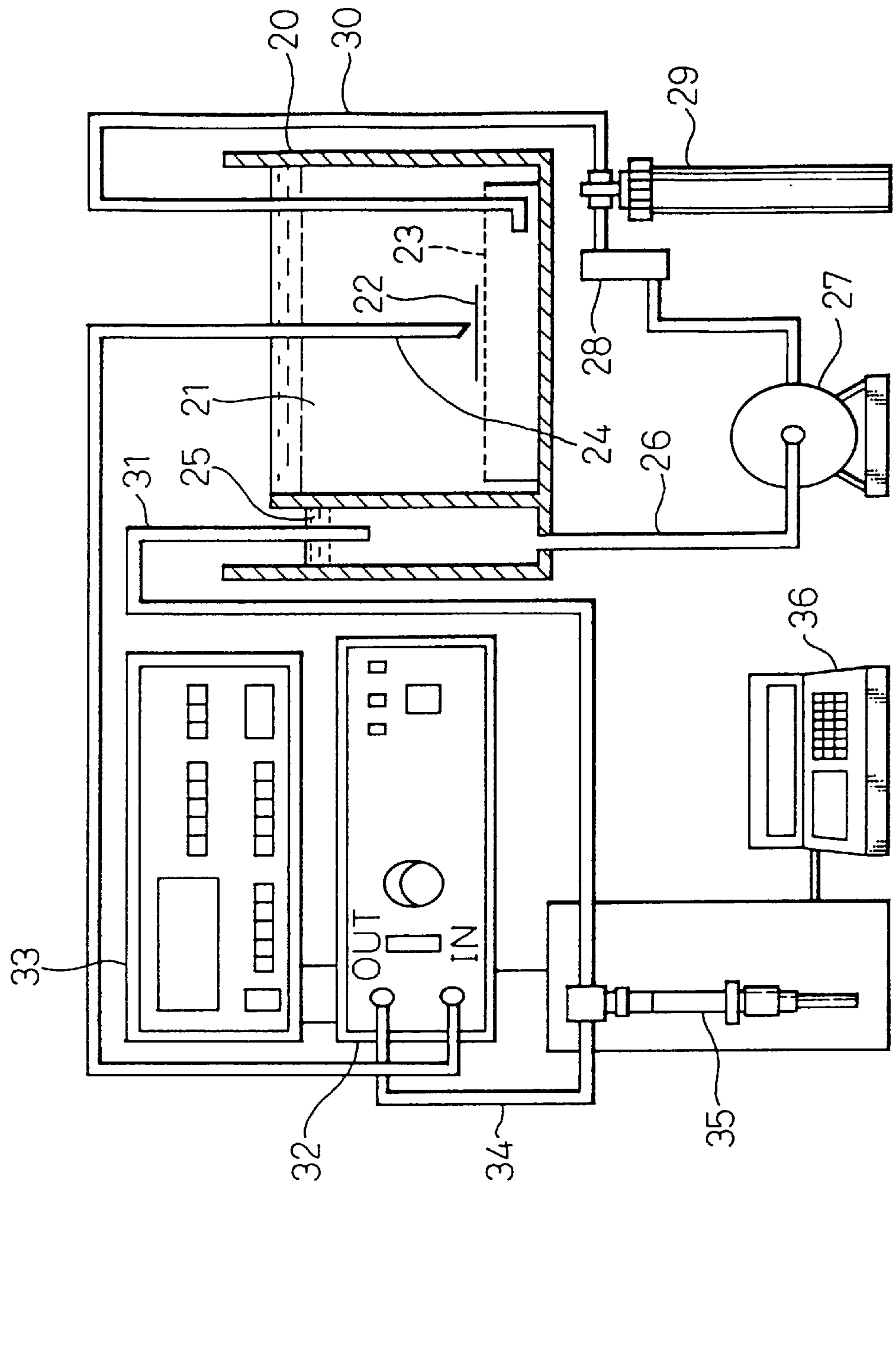
FIG. 1 is a conceptual drawing showing the process for measuring the fine particle concentration (surface-adhering amount) for a plastic film or sheet sample.

The method will first be summarized with reference to FIG. 1. The specific measuring conditions will be described later.

A test piece 22 to be measured is immersed in a tank 20 holding ultrapure water 21. The fine particles adhering to the surface of the test piece are thereby released from the test piece as time passes, and disperse throughout the ultrapure water. At this point, a prescribed amount of ultrapure water is drawn out from the surface of the test piece by a syringe sampler 35 through a drawing pipe 24, and the fine particle concentration (number of particles in the sample solution) is measured with a light-scattering particle detector.

When the test piece is immersed in the ultrapure water, the amount of fine particles released from the test piece surface is proportional to the concentration of fine particles adhering to the test piece surface, and since the released fine particles continue to disperse in the ultrapure water, the concentration of dispersed particles is proportional to the amount of fine particles which have been released. Consequently, the concentration of fine particles in the region of ultrapure water where the fine particles are dispersing near the test piece surface is roughly proportional to the concentration of fine particles adhered to the test piece surface. Naturally, since the amount of ultrapure water is sufficiently large compared to the size (surface area) of the test piece so as to be considered infinite, the size of the test piece is assumed not to affect the measurement results. The documents cited above have reported that the degree of cleanliness of test piece surfaces can be measured by this method and confirmed, while the measuring method has since become an established practice in the field.

The plastic film or sheet of the invention is not restricted, but is preferably of as high cleanliness as possible.

The method of producing a highly clean plastic bag according to the invention will now be described. The plastic film or sheet used is prepared by calender working, the blown-film extrusion method, T-die method, etc. The blown-film extrusion method is highly productive for making bags, since films and sheets formed thereby result in tube shapes requiring only cutting to the length of the bag and sealing of the bottom section. Films or sheets which are not in tube shapes are laid over each other, or one is folded over itself, and the bottom and/or sides are sealed to form a bag.

Since bags formed from tube-shaped films or sheets are not easily cleaned at the inner surfaces, the inner surfaces of the bags are preferably formed by the blown-film extrusion method in such a manner that the degree of cleanliness is within the range of the invention. A suitable method is one whereby during formation of the blown film or sheet, a highly pure gas, for example high purity nitrogen gas passed through a filter to remove fine contaminant particles of 0.2–0.3 μm or greater, is fed into the tube to blow up the tube. When the tube of a film or sheet is obtained in this manner, washing of the inner surface of the tube is unnecessary, thus allowing streamlining of the washing step, and it is therefore ideal as a plastic film or sheet for the invention.

The cleaning of the plastic film or sheet is performed on the outer surface after immersion in the case of a tube-shaped film or sheet, and on both sides in the case of a flat film or sheet. The formation of the film or sheet should produce as little contamination in the chamber as possible, and the outer surface of the film or sheet is also preferably of higher cleanliness than a normal film or sheet.

During formation of the film or sheet it is impossible to maintain the surface of the film or sheet at the high level of cleanliness for the present invention.

Thus, the plastic film or sheet is washed with ultrapure water in a clean room. The cleanliness of the clean room 16 should be class 100 or higher, and if possible class 10 or higher. Washing of the plastic film or sheet with ultrapure water in the clean room, followed by the steps described later, yielded a highly clean plastic film or sheet for use according to the invention.

In the ultrapure water, generally the electrical resistivity is 15–17 M Ω·cm (25° C.) or greater, fine particles of 0.3 μm or greater are present in an amount of about 100 per ml or less and $SiO_2$ in an amount of 10 μg/l or less, but for higher cleaning, preferably the electrical resistivity is about 16 to about 18 M Ω·cm (25° C.), fine particles of 0.05 μm or greater are present in an amount of 10 per ml or less and $SiO_2$ in an amount of 0.1 μg/l or less. The cleanliness must be higher than the desired cleanliness of the plastic film or sheet.

Figure 2:
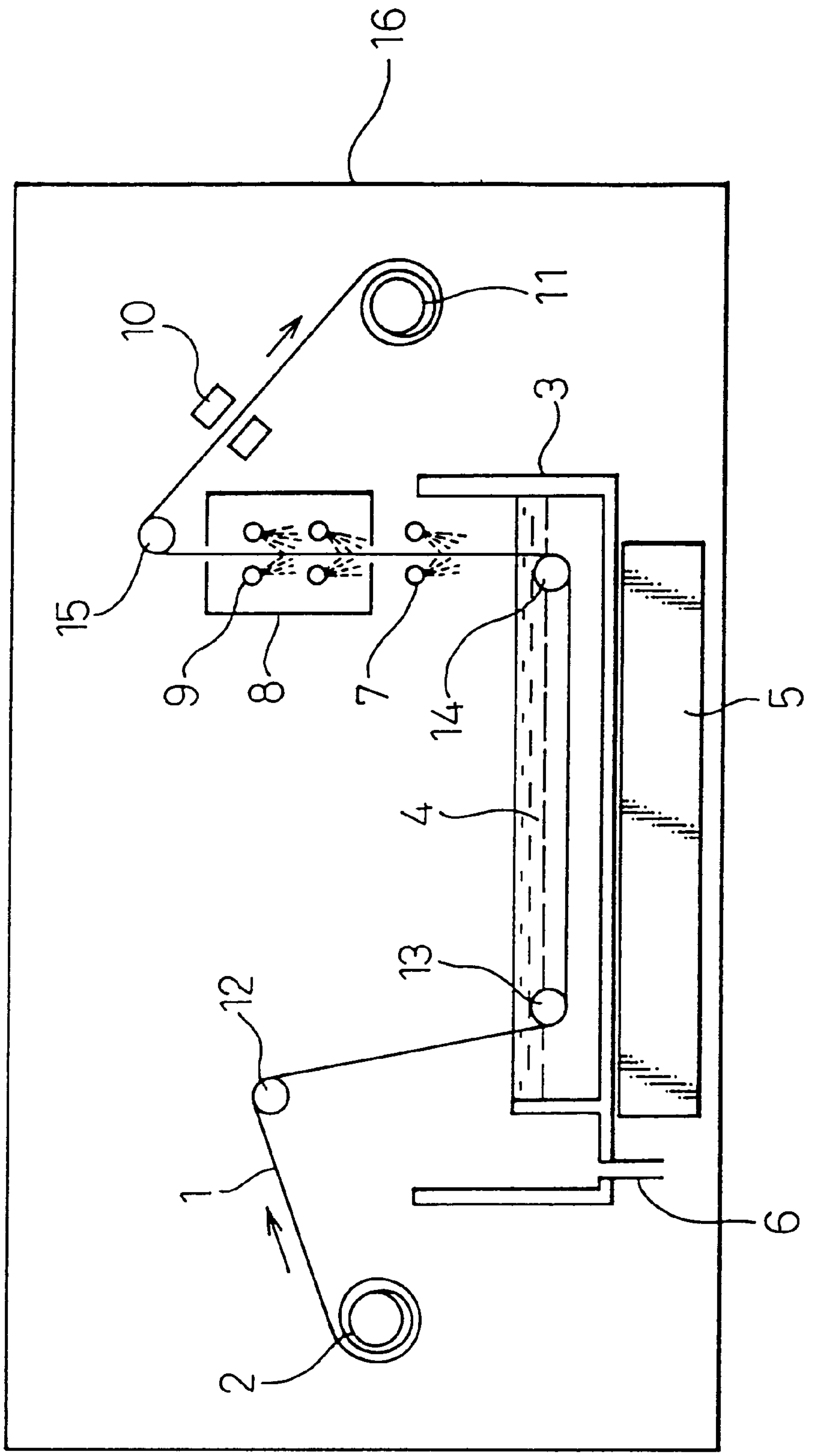
FIG. 2 is a sketch of a cleaning apparatus for high-cleaning of a plastic film or sheet according to the invention.

FIG. 2 shows a method of cleaning a plastic film or sheet with ultrapure water according to the invention. In FIG. 2, numeral 3 indicates an ultrapure water bath which is filled and supplied with ultrapure water 4. The plastic film or sheet 1 is wound on a roll 2, the film or sheet 1 is fed out from the roll and immersed in the ultrapure water bath 3 after being directed around a guide roller 12, and runs through the ultrapure water. Numerals 13 and 14 are guide rollers. The ultrapure water bath is situated on an ultrasonic vibrator 5 to apply ultrasonic waves to the ultrapure water.

Most of the contaminants adhering to the plastic film or sheet will be released by running through the ultrapure water under the ultrasonic waves, but according to the invention, in order to reliably achieve a high level of cleanliness the plastic film or sheet 1 is drawn out of the ultrapure water and subjected to spraying with ultrapure water for forcible washing. Numeral 7 indicates spraying nozzles. The spraying nozzles are provided on both sides of the film or sheet, and the spraying angle is preferably directed at a downward slant with respect to the film or sheet. The spraying conditions for the forcible washing with ultrapure water were, for example, 17 liters/min for a 600 mm-wide film, and corresponding conditions are appropriate. The major purpose is washing off of the contaminated washing water with fresh ultrapure water in a vertical manner. This also removes contaminants which were not released in the ultrapure water bath. The sprayed ultrapure water drops down into the ultrapure water bath, and the ultrapure water overflowing from the water bath in which fresh ultrapure water is continuously supplied is eliminated from a drainage outlet 6. The eliminated ultrapure water is then purified with an ion-exchange resin, reverse osmosis equipment or ultrafiltration membrane filter according to a publicly known method, and is recirculated for use.

The plastic film or sheet which has been cleaned by spraying with ultrapure water then enters a drying room 8, where draining and drying are performed. The drying is accomplished, for example, through water removal by blowing clean hot air with an air knife. Numeral 9 indicates blowing nozzles. Hot air directed downward and slanted with respect to the film or sheet results in easier drainage and drying. The hot air used is high-purity air with a cleanliness of class 10 or greater, and though the temperature will depend on the heat resistance of the plastic film or sheet, it is generally suitable at between 45–65° C.

The dried plastic film or sheet is then passed through a destaticizer 10 for removal of static electricity, and wound around a roll 11. The destaticizer used may be a voltage application type, such as a Pulser Flow Controller (PFC-20) (trademark) manufactured by Richmond Static Control Services Inc. A voltage is applied to the surface of the highly cleaned plastic film or sheet to remove the static electricity, to thus prevent electrostatic re-adhesion of the fine particles onto the surface of the highly cleaned plastic film or sheet.

The procedure described above is carried out in a clean room 16 with a cleanliness of around class 10.

The cleaned plastic film or sheet is then cut if necessary, and when preparing a bag, one end of the double layered film or sheet is heat-sealed to form a bag. The cutting and heat-sealing are carried out in a clean room with a cleanliness of class 100 or greater, or even class 10 or greater, and the apparatus and utensils used are all cleaned, with care that the bag is not contaminated thereby.

EXAMPLE

The present invention will now be explained in more detail by way of the following example.

A polyethylene used did not contain any additive which breads out after a product is shaped. A polyethylene tube was formed by a blown-film extrusion method and wound on a roll. The thickness of the film was 80 $\mu$m. The lay flat width of the tube or film (width of the film when doubled over) was 30 cm. The gas fed into the tube was 99.999% nitrogen gas from which contaminating fine particles of 0.2 $\mu$m or greater had been removed with a filter.

The film wound on the roll was then washed in a washing apparatus such as shown in FIG. 2. The cleanliness in the clean room 16 in which the washing apparatus was situated was class 10.

The ultrapure water used had an electrical resistivity of about 16–18 M Ω·cm, and contained ultrafine particles of 0.3 $\mu$m or greater in an amount of 0.8 per ml and $SiO_2$ in an amount of 20 ppb or less. The spacing between the guide rollers 13 and 14 in FIG. 2 was 0.38 m, and the film feed rate was 3.6 m/min. The frequency of the ultrasonic vibrator was 38 kHz.

The ultrapure water spraying nozzles 7 were slit-shaped (perpendicular to the plane of FIG. 2) and placed at a downward slant for a water spray orientation of 45° with respect to the film surface. The water spray volume was 17 liters/min at a width of 600 mm.

The hot air for drying had a cleanliness corresponding to class 10, a temperature of 65° C. and an air flow rate of 100 m/min from 4 nozzles in 2 levels. The blowing direction of the hot air and the nozzle shape were the same as the spraying nozzles described above.

The plastic film 1 was then passed through a voltage application-type static eliminator or destaticizer 10.

The wound up film was cut, heat sealed, and formed into a bag with a width of 30 cm and a length of 40 cm, in a room with a cleanliness of class 10.

The fine particle adhesion state of the bag was then measured. The apparatus used was the one shown in FIG. 1. A water bath 20 having a length of 21.0 cm and a width of 17.5 cm (not counting the section of the overflow bath 25) was filled with ultrapure water to a height of 28.0 cm, and allowed to overflow from one side. Numeral 25 indicates an overflow bath as a reservoir. The ultrapure water is precleaned during the measurement. The cleaning is accomplished by passing the ultrapure water in the overflow bath through a fine particle-collecting filter 29 via a circulating pipe 26 and circulating pump 27, feeding it through another circulating pipe 30 to the bottom of the water bath, thus causing it to overflow from the water bath for circulation of the solution. The fine particle-collecting filter is capable of collecting fine particles of 0.3 $\mu$m or greater. Numeral 28 indicates a flow rate meter.

In this example, the water is circulated for cleaning until the fine particles with a particle size of 0.3 $\mu$m or greater in the water are reduced to 2 per ml or less. Z-propanol (isopropyl alcohol (IPA)) is also added to the ultrapure water to 5 volume percent to stabilize dispersion of the fine particles.

For the measurement, the background amount of fine particles in the ultrapure water is first measured. During the background measurement it is important to take care not to generate air bubbles. The IPA is added to prevent air bubbles, but there is no point in measurement of the fine particles while air bubbles are being generated. Circulation of the water is therefore suspended during this measurement. The measurement is conducted at normal temperature. The ultrapure water is introduced from the water bath 20 into a light-dispersing particle detector 32 through a drawing pipe 24 during the measurement. A syringe sampler 35 is used for this purpose. A 10 ml sample of the ultrapure water is drawn by the syringe sampler and fed to the light-scattering particle detector, and the number of fine particles is measured during the feeding. After completion of this measurement the ultrapure water is fed by the syringe sampler to the overflow bath through a feeding pipe 31. The number of detected fine particles in the sample solution is calculated by a submerged particle counter 33. Numeral 36 indicates a control section which controls the flow rate and drawing rate of the taken sample. The light-scattering particle detector is one conforming to the system of JIS B9925. Detection of particles smaller than 0.3 $\mu$m is difficult with laser light.

The measuring time is about 60 seconds each time, with about 10 seconds for the water to return from the syringe sampler to the overflow bath. Thus, the measurement is performed about every 70 seconds. Ten continuous measurements were taken. As a result, the number of fine particles of 0.3 $\mu$m or greater was an average of 1.7 per 10 ml, with a standard deviation of 1.06.

A test piece is then immersed in the bath and measured.

The test piece 22 is gently placed on a platform 23. The test piece is generally a square 10–15 cm on each side, or a disk with a diameter of about 10–15 cm. Within this range there is virtually no influence on the measurement by fluctuations in size. In this example there was used a rectangle with a length of 15 cm cut from a bag as described above. The platform 23 is situated at a height of 3.5 cm from the bottom of the bath. The platform used was a thin plate with multiple pores (diameter: 0.5 mm, center spacing of pores: 0.8 mm).

The test piece was placed at the center of the platform and measurement was started after 2 minutes. The tip of the drawing pipe 24 was brought near the surface of the test piece (within 1 mm), and 10 ml of solution was drawn out. The tip of the drawing pipe preferably has a slanted opening with an angle of 45° as shown in the drawing. This prevents the tip of the pipe from clinging onto the test piece and also provides a greater cross-section for the opening. The inner diameter of the drawing pipe is 2 mm.

The method of drawing the water and the measurement of the fine particles are the same as during for the background measurement described above. Here as well, it is important that the measurement be conducted in a stable state, without generation of air bubbles. A total of 30 continuous measurements are taken, and since the first 10 do not give stable fine particle concentrations due to air bubbles, etc., the 20 measurements from the 11th to the 30th measurement are treated as the measurement data, and the average thereof is calculated.

The measurement results gave an average of 24.5 per 10 ml, with standard deviation 3.85, for fine particles of 0.3 $\mu$m or greater with a test piece of the surface (outer) of the bag, and an average of 27.3 per 10 ml, with standard deviation 4.03, for fine particles with a test piece of the inner surface of the bag.

The background value was then subtracted therefrom and the value was converted relative to 1 ml, which gave a number of fine particles on the surface of the bag of 2.3 per ml on the outer surface and 2.6 per ml on the inner surface.

As a comparative example, the ultrasonic vibrator 5 and ultrapure water spraying nozzle 7 were removed from the apparatus shown in FIG. 2, after which the rest of the apparatus shown in FIG. 1 was used for cleaning of a plastic bag in the same manner as the example, and the concentration of fine particles was measured.

As a result, the concentration (number) of fine particles on the surface of the bag was 30.2 per ml, with a standard deviation of 8.26.

It has not been a conventional practice to perform high cleaning of plastic films using ultrapure water in a clean room. The cleanliness of conventional plastic films and sheets has been on the order of, for example, an amount of 10,000 per ml of particles with a size of 0.3 $\mu$m or greater.

The bag used above was prepared after cleaning of a tube-shaped plastic film, but it will be obvious that the cleaning may also be performed simultaneously on both sides of a single plastic film or sheet.

Industrial Applicability

According to the present invention, both sides of plastic films and sheets, or the insides and outsides of plastic bags, may be cleaned to a high degree not possible according to the prior art. Such highly cleaned plastic films and sheets, and especially bags made therefrom, are suitable for use in the field of semiconductors, etc. which require especially high degrees of cleanliness.

Furthermore, the process for producing them is highly productive as it may be carried out continuously and in a highly efficient manner, from the formation of the plastic film or sheet to the washing with ultrapure water.

What is claimed is:

1. A highly clean plastic film or sheet, wherein upon immersing a test piece of the plastic film or sheet in ultrapure water, extracting pure water from a vicinity of the surface of said test piece and measuring the concentration (number) of fine particles 0.3 $\mu$m or greater in size dispersed in the extracted ultrapure water, the concentration is no greater than 1000 per ml on both sides of the plastic film or sheet.

2. A highly clean plastic film or sheet according to claim 1, wherein said concentration is no greater than 10 per ml.

3. A highly clean plastic film or sheet according to claim 1, wherein said concentration is no greater than 5 per ml.

4. A highly clean plastic film or sheet according to claim 3, wherein the surface resistance of said plastic film or sheet is no greater than $10^9$ Ω/□.

5. A highly clean plastic bag which is constructed from a highly clean plastic film or sheet according to claim 1.

6. A highly clean plastic bag according to claim 5, wherein said plastic film or sheet has a thickness of 30–150 $\mu$m.

7. A process for high cleaning of a plastic film or sheet, wherein the high-cleaning process for the plastic film or sheet involves (A) highly cleaning the plastic film or sheet in a clean room, and (B) said high-cleaning process includes the steps of i) immersing the plastic film or sheet in ultrapure water for washing, ii) exposing both sides of the plastic film or sheet drawn from said ultrapure water to spraying with ultrapure water for forcible washing, iii) removing the water from the plastic film or sheet, and iv) destaticizing the plastic film or sheet.

8. The process according to claim 7, wherein said clean room has a cleanliness of class 100 or greater.

9. The process according to claim 7, wherein said clean room has a cleanliness of class 10 or greater.

10. The process according to claim 7, wherein ultrasonic waves are applied to said ultrapure water in which said plastic film or sheet is immersed.

11. The process according to claim 7, wherein said forcible washing is accomplished by spraying of ultrapure water.

12. The process according to claim 7, wherein said water removal is accomplished by blowing it with hot air using an air knife.

13. The process according to claim 7, wherein said high cleaning comprises the steps of immersing and running a continuous plastic film or sheet in ultrapure water, exposing both sides of the plastic film or sheet drawn from the ultrapure water to spraying with ultrapure water for forcible washing, removing the water from the plastic sheet by blowing it with hot air with an air knife, and then subjecting the plastic film or sheet to voltage application-type electrostatic destaticization treatment, all in a clean room of class 10 or greater.

14. The process according to claim 7, wherein said plastic film or sheet is tube-shaped, and a step is included of forming a bag from the plastic film or sheet by cutting and/or heat sealing in said clean room, after high cleaning treatment of said tube-shaped plastic film or sheet.

15. The process according to claim 14, wherein said tube-shaped plastic film or sheet is a tube-shaped film or sheet obtained by an inflation film molding method using high-purity gas.

16. The process according to claim 7, wherein a plastic film or sheet with a surface electric resistance of $10^9$ Ω/□ or less is used as the starting plastic film or sheet.

17. The process according to claim 7, wherein upon immersing a test piece of the plastic film or sheet in ultrapure water, extracting pure water from near the surface of said test piece and measuring the concentration (number) of fine particles 0.3 μm or greater in size dispersed in the extracted ultrapure water, the concentration of said plastic film or sheet obtained by said high cleaning is no greater than 10 per ml on both sides of the plastic film or sheet.

18. The process according to claim 17, wherein said concentration is no greater than 5 per ml.

* * * * *